United States Patent
Taniguchi et al.

(10) Patent No.: US 6,450,917 B2
(45) Date of Patent: Sep. 17, 2002

(54) SHIFT CONTROL SYSTEM FOR CONTINUOUSLY VARIABLE TRANSMISSION

(75) Inventors: Hiroji Taniguchi, Okazaki; Katsumi Kono, Toyota; Kenji Matsuo, Toyota; Hideki Yasue, Toyota; Tadashi Tamura, Toyota; Daisuke Inoue, Toyota; Yoshiaki Yamamoto, Toyota; Hiroki Kondo, Toyota; Isao Takagi, Okazaki; Zenichiro Mashiki, Nisshin; Hirofumi Kubota, Mishima; Hiroya Tanaka, Aichi-ken; Shinichi Matani, Toyota, all of (JP)

(73) Assignee: Toyota Jidosha Kabushiki Kaisha, Toyota (JP)

(*) Notice: Subject to any disclaimer, the term of this patent is extended or adjusted under 35 U.S.C. 154(b) by 0 days.

(21) Appl. No.: 09/849,256

(22) Filed: May 7, 2001

(30) Foreign Application Priority Data

May 19, 2000 (JP) .......................................... 2000-149084

(51) Int. Cl.⁷ .............................................. B60K 41/12
(52) U.S. Cl. .......................................... 477/49; 477/46
(58) Field of Search ............................... 477/46, 47, 49

(56) References Cited

U.S. PATENT DOCUMENTS

| | | | |
|---|---|---|---|
| 4,680,990 A | * | 7/1987 | Ohgami |
| 4,833,944 A | * | 5/1989 | Tanaka |
| 4,846,019 A | | 7/1989 | Kumura |
| 5,820,513 A | | 10/1998 | Greenwood |
| 5,931,761 A | | 8/1999 | Tsutsui et al. |
| 6,134,495 A | * | 10/2000 | Hollingsworth ............. 477/146 |
| 6,174,261 B1 | * | 1/2001 | Wtanabe et al. ............. 477/43 |

FOREIGN PATENT DOCUMENTS

| JP | 60 260754 | 12/1985 |
|---|---|---|
| JP | 63-68426 | 3/1988 |

\* cited by examiner

*Primary Examiner*—Dirk Wright
(74) *Attorney, Agent, or Firm*—Oblon, Spivak, McClelland, Maier & Neustadt, P.C.

(57) ABSTRACT

A speed change control system for a continuously variable transmission, for controlling a gear ratio by deciding an abrupt acceleration demand of a driver, to effect an abrupt speed change when it is decided that the driver demands an abrupt acceleration. The speed change control system comprises: a drive state decider for deciding that the vehicle has changed from a driven state to a drive state, when said abrupt acceleration is demanded at the driven state; and a speed change controller for controlling said continuously variable transmission to effect said abrupt speed change, after said drive state decider decides that the vehicle has changed from the driven state to the drive state.

31 Claims, 5 Drawing Sheets

SHIFT CONTROL SYSTEM FOR CONTINUOUSLY VARIABLE TRANSMISSION

BACKGROUND OF THE INVENTION

1. Field of the Invention

The present invention relates to a system for controlling a gear ratio of a continuously variable transmission and, more particularly, to a system for performing a speed change control when a driver demands an abrupt acceleration.

2. Related Art

The speed change control in the continuously variable transmission is executed by determining a target input speed on the basis of running conditions such as a demand for a driving force, e.g., an accelerator opening (or depression), or the vehicle speed or on the basis of a manual selection by the driver, and by controlling the gear ratio so that the actual input speed may be equal to the target input speed. For this speed change control, the intended target input speed is finally achieved not by changing the gear ratio so that the actual input speed may be instantly equal to its target value, but by setting a transient target input speed determined from the target input value, by feedback-controlling the gear ratio of the continuously variable transmission so that the actual input speed may be equal to the transient target input speed, and by updating the transient target input speed sequentially. As a result, the speed changing rate is determined on how to set the transient target input speed. Therefore, the ordinary speed change is executed by setting the transient target input speed delayed by first-order time lag from the target input speed so that it is executed at such a rate as to raise neither any shock or the delay feel of the speed change.

With this setting of the speed changing rate at all times, however, a demanded acceleration feel may not be obtained due to the delay in the speed change when an abrupt acceleration is demanded by depressing the accelerator pedal abruptly and deeply. In order to eliminate this disadvantage, in the invention disclosed in Japanese Patent Application Laid-Open No. 63-68426, a downshift of a high speed changing rate is executed by changing the target input speed of the continuously variable transmission stepwise on the basis of the decision of an abrupt acceleration, if this abrupt acceleration is manually effected by the driver in a vehicle having the continuously variable transmission mounted thereon. When the gear ratio of the continuously variable transmission is to be feedback-controlled, more specifically, the amount of control is increased the more for the larger deviation between the present value and the target value so that the speed changing rate becomes the higher. Therefore, the increase amount of the transient target input speed is enlarged or changed stepwise so that the speed changing rate is raised to improve the acceleration response to the abrupt acceleration demand.

In the prior art, the abrupt speed change described above for increasing the target input speed stepwise is executed when the decision of the abrupt acceleration is held by the operation of the drive for the abrupt acceleration, as effected by the abrupt and deep depression of the accelerator pedal by the driver. Therefore, a serious longitudinal vibration (or a surging) or a resulting shock may occur when an abrupt speed change is executed in the driven state where a decelerating manipulation is made by returning the accelerator pedal to drive the engine forcibly by the running inertial force.

When the abrupt acceleration is manipulated for the engine in the driven state, more specifically, the output shaft torque changes from the state of a negative torque to the state of a positive torque so that the looseness of the drive line is reduced to reverse the twist of the elastic line. As a result, there occurs the so-called "longitudinal vibration (or the surging)" to cause the pitching or rocking of the vehicle body in a back and forth direction. In order to prevent this pitching or rocking, the so-called "rounding control" for raising the engine torque gently is executed for the abrupt acceleration in the driven state.

On the other hand, the gear ratio control of the continuously variable transmission, accompanying the manipulation for the abrupt acceleration, is performed by raising the transient target input speed stepwise to raise the gear ratio abruptly. With the gear ratio being thus controlled, the inertial force accompanying the rise in the gear ratio acts as a negative torque on the engine.

When the rounding control of the engine torque and the abrupt speed change control of the continuously variable transmission progress simultaneously as the decision of the abrupt acceleration is held, these two controls interfere with each other to delay the rise in the engine torque. As a result, the engine is still in the driven state at the instant when the rounding control of the engine torque is ended, so that the engine torque is abruptly raised from that state. After all, even if the rounding control is executed for raising the engine torque, the changing rate (or the changing gradient) of the torque is raised at the instant when the vehicle changes from the driven state to the drive state, that is, when the output shaft torque of the engine is switched from the negative torque to the positive torque, thereby to cause the serious surging and the resulting shock.

SUMMARY OF THE INVENTION

A main object of the invention is to provide a speed change control system which can prevent the surging or the shock even if an abrupt acceleration is manipulated when a prime mover is in the driven state, without deteriorating the acceleration responsibility.

Therefore, the speed change control system of the invention is characterized in that the abrupt speed change control of the continuously variable transmission is executed after the vehicle was changed from the driven state to the drive state. According to an aspect of the invention, more specifically, there is provided a controller for effecting an abrupt speed change by judging an abrupt acceleration demand of the driver, when it is judged that the driver demands the abrupt acceleration. Moreover, the controller comprises: drive state deciding means or a judging device for judging, when said abrupt acceleration demand is one from the driven state of the vehicle, that the vehicle has changed from the driven state to the drive state; and speed change control means or a shift controller for controlling said continuously variable transmission to effect said abrupt speed change, after it is judged that the vehicle has changed from the driven state to the drive state.

In this invention, therefore, if the vehicle is in the driven state when the abrupt acceleration is demanded, it is decided by the drive state deciding means that the vehicle has changed from the driven state to the drive state. If it is decided that the vehicle has changed from the driven state to the drive state, moreover, the abrupt speed change control is executed in the continuously variable transmission. Even if the rounding control of the output torque of the prime mover is executed in response to the abrupt acceleration demand, therefore, the interference between the two controls and the resulting delay in the change to the drive state are avoided because the abrupt speed change control of the continuously variable transmission is not executed yet at that instant of execution. Moreover, the abrupt speed change control of the continuously variable transmission is executed after the change of the vehicle into the drive state so that the changing rate (or the changing gradient) of the torque at the switching time from the driven state to the drive state is relaxed to prevent or suppress the surging and the resulting shock.

Said speed change control means or the shift controller in the invention may be constructed to control the continuously variable transmission to interrupt the speed change in the continuously variable transmission, if said abrupt acceleration demand is one from the driven state of the vehicle, for the time period from the decision of said abrupt acceleration demand to the change of the vehicle to the drive state.

With this construction, the speed change control of the continuously variable transmission is not executed after the decision of the abrupt acceleration demand was held and before the change from the driven state to the drive state. In this time period, therefore, it is possible to execute the control the prime mover on the basis of the abrupt acceleration demand, such as the rounding control of the output torque solely. As a result, the prime mover can be controlled easily and precisely, and the timing for starting the abrupt speed change control in the continuously variable transmission can be properly set.

Moreover, said speed change control means or the shift controller in the invention may be constructed to control the continuously variable transmission to perform the abrupt speed change in the continuously variable transmission, if said abrupt acceleration demand is one from the drive state of the vehicle, when said abrupt acceleration demand is decided.

With this construction, the abrupt speed change control of the continuously variable transmission is executed instantly in response to the abrupt acceleration demand, if any in the drive state, so that the shock is not deteriorated to improve the acceleration responsibility.

Moreover, said speed change control means or the shift controller in the invention may be constructed to control the gear ratio of the continuously variable transmission so that an input speed may be a target input speed set on the basis of the running state of the vehicle, and to make an increase amount of the target input speed larger than that at a speed change other than the abrupt speed change when the abrupt speed change is to be performed.

With this construction, in the case of an abrupt speed change, the target input speed is drastically raised to raise the speed changing rate so that a speed change according to a demand can be made.

The above and further objects and novel features of the invention will more fully appear from the following detailed description when the same is read with reference to the accompanying drawings. It is to be expressly understood, however, that the drawings are for the purpose of illustrations only and are not intended as a definition of the limits of the invention.

DETAILED DESCRIPTION OF THE PREFERRED EMBODIMENTS

Figure 4:
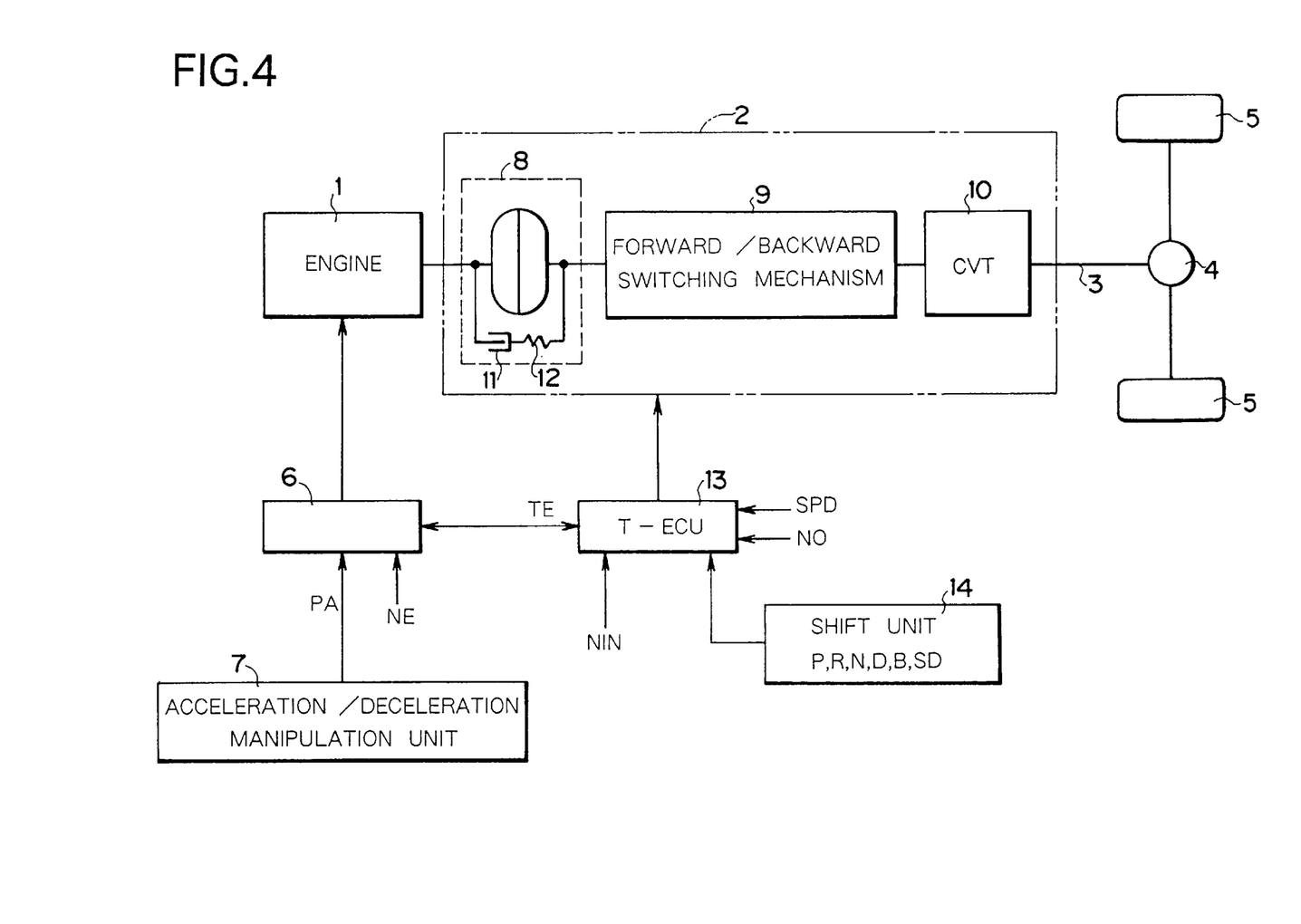
FIG. 4 is a block diagram schematically showing a drive system of a vehicle, to which the invention is directed, and a control system for the drive system.

The invention will be specifically described in connection with its embodiments. First of all, here will be described one example of a power transmission line of a vehicle, to which the invention is directed. In FIG. 4, a prime mover 1 is connected to a transmission mechanism 2, of which the output shaft 3 is connected through a differential 4 to right and left drive wheels 5. Here, the prime mover 1 includes a variety of prime movers to be employed in the vehicle, such as an internal combustion engine, e.g., a gasoline engine or Diesel engine, an electric motor or a unit combining those internal combustion engine and electric motor. In the following description, the prime mover 1 is exemplified either by the so-called "direct injection gasoline engine" which can perform a homogeneous combustion or a stratified combustion by directly injecting fuel in a cylinder and controlling its injecting rate and a timing, or by the gasoline engine which is equipped with an electronic throttle valve capable of controlling the throttle opening electrically freely.

This engine 1 is so constructed that it can be electrically controlled, and is equipped with an electronic control unit (E-ECU) 6 constructed mainly of a microcomputer for the electric control. This electronic control unit 6 is constructed to control at least the output of the engine 1, and this control includes the rounding control for relaxing the rise of the engine torque when demanded drive quantity is high. On the other hand, the electronic control unit 6 is fed with an output shaft speed (or an engine speed) NE and the demanded drive quantity such as an accelerator pedal depression or opening PA as the data for their controls.

These demanded drive quantities are, in short, signals for increasing/decreasing the output of the engine 1, and can adopt either a manipulation signal of an accelerating/decelerating manipulation unit 7 such as an accelerator pedal to be manipulated by the driver, or a signal generated by processing the manipulation electrically. In addition, there is adopted a demanded drive quantity signal which comes from the (not-shown) cruise control system for keeping the vehicle speed at a set value.

On the other hand, the transmission mechanism 2 is constructed to include a fluid coupling mechanism 8, a forward/backward switching mechanism 9 and a continuously variable transmission (CVT) 10. The fluid coupling mechanism 8 is, in short, a device which is constructed to transmit the torque through a fluid or oil between a member on the input side and a member on the output side. This device is exemplified by a torque converter which is adopted in the ordinary vehicle. On the other hand, this fluid coupling mechanism 8 is provided with a lock-up clutch 11. This lock-up clutch 11 is the clutch which is constructed to couple. the input side member and the output side member directly through mechanical means such as the friction discs, and is equipped with a damper 12 made of an elastic member such as a shock-absorbing coil spring. When the fluid coupling mechanism 8 is provided for driving the engine 1 continuously even on a stopped vehicle, an automatic clutch to be automatically applied/released on the basis of the state of the vehicle can be employed in place of the aforementioned fluid coupling mechanism 8.

The fluid coupling mechanism 8 is connected at its input member to the output member of the engine 1 and at its output member to the input member of the forward/backward switching mechanism 9. This forward/backward switching mechanism 9 is constructed of a double-pinion type planetary gear mechanism, for example, which is composed of (not shown): an input element of one of a sun gear and a carrier; an output element of the other; brake means for fixing a ring gear selectively; and clutch means for connecting any two rotary elements of the three elements of the sun gear, the carrier and the ring gear selectively to integrate the entire planetary gear mechanism. In short, the forward/backward switching mechanism 9 is constructed to set the forward state by applying the clutch means and to set the backward state by applying the brake means.

The continuously variable transmission 10, as shown in FIG. 4, is a mechanism capable of changing the ratio between the speed of a member on its input side and the speed of a member on its output side, i.e., a gear ratio steplessly (or continuously), and can adopt the belt-type continuously variable transmission or the toroidal-type (or traction-type) continuously variable transmission. One example of the belt-type continuously variable transmission 10 will be briefly described with reference to FIG. 5. This mechanism 10 is constructed to include: a driving pulley (or primary pulley) 20; a driven pulley (or secondary pulley) 21; and a belt 22 made to run on those pulleys 20 and 21. These pulleys 20 and 21 are individually composed of: stationary sheaves 23 and 24; movable sheaves 25 and 26 for moving toward and away from the stationary sheaves 23 and 24; and hydraulic actuators 27 and 28 for pushing the movable sheaves 25 and 26 toward the stationary sheaves 23 and 24.

Figure 5:
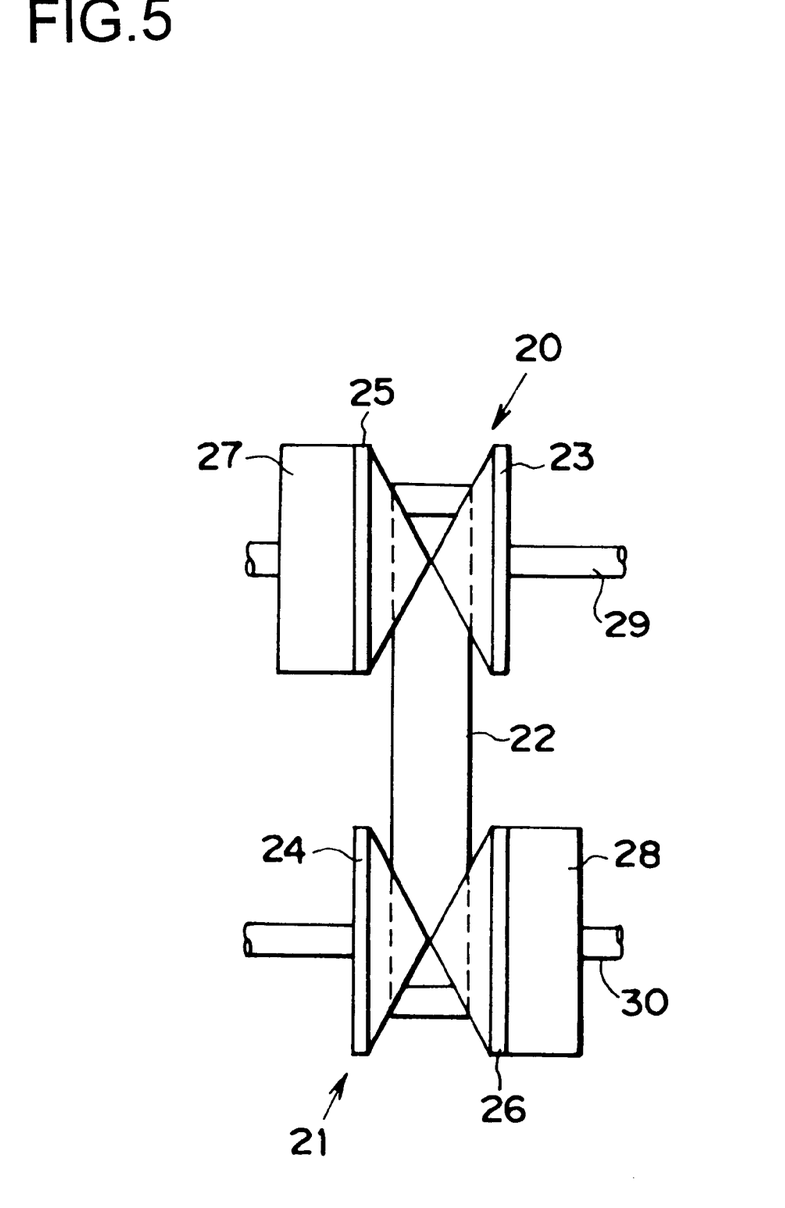
FIG. 5 is a diagram showing one example of a continuously variable transmission of the drive system schematically.

The driving pulley 20 is mounted on an input shaft 29, and the driven pulley 21 is mounted on an output shaft 30 arranged in parallel with the input shaft 29. To the hydraulic actuator 28 in the driven pulley 21, moreover, there is fed the oil pressure which accords to the demanded drive quantity represented by the accelerator depression PA so that the belt 22 is given the tension necessary for transmitting the torque. To the hydraulic actuator 27 of the driving pulley 20, on the other hand, there is fed working oil for establishing the gear ratio to equalize the speed of the input shaft 29 to the target input value. In short, by changing the widths of grooves (i.e., the gaps between the stationary sheaves 23 and 24 and the movable sheaves 25 and 26) in the individual pulleys 20 and 21, the winding radii of the belt 22 on the individual pulleys 20 and 21 are changed to larger and smaller values to execute the speed change. By feedback-controlling the quantity of the working oil on the driving pulley 20 on the basis of the deviation between the actual input speed and the target input speed, more specifically, the speed change is executed so that the changing rate is the higher for the larger deviation.

In the continuously variable transmission 10 shown in FIG. 5, therefore, a gear ratio on the lowest side (i.e., a maximum gear ratio) $\gamma_{max}$ is set when the winding radius of the belt 22 on the driving pulley 20 is the minimum and when the winding radius of the belt 22 on the driven pulley 21 is the maximum. On the contrary, a gear ratio on the highest side (i.e., a minimum gear ratio) $\gamma_{min}$ is set when the winding radius of the belt 22 on the driving pulley 20 is the maximum and when the winding radius of the belt 22 on the driven pulley 21 is the minimum.

The controls of the individual states of the application/release and the slipping half-application of the lock-up clutch 11 in the transmission mechanism 2 and the controls of the forward/backward switching actions of the mechanism 9 and the gear ratio in the continuously variable transmission 10 are basically made on the basis of the running state of the vehicle. For these controls, there is provided an electronic control unit (T-ECU) 13 which is constructed mainly of a microcomputer.

This electronic control unit 13 is connected in a data communicating manner with the aforementioned electronic control unit 6 for the engine, and is fed with control data including a vehicle speed SPD, and the output speed No and the input speed NIN of the transmission mechanism 2. With the electronic control unit 13, there is electrically connected a shift unit 14 for selecting the individual states (or positions) for the transmission mechanism 2, which include: a stop state (or a parking position: P); a backward state (or a reverse position: R); a neutral state (or a neutral position: N); an automatic forward state (or a drive position: D) in which a gear ratio is automatically set according to running states of the vehicle to make an ordinary run; a state of adopting the pumping loss of the engine 1 as a braking force (or a brake position: B); and a state of inhibiting the setting of the gear ratio on a higher speed side than a predetermined value (or a SD position).

The gear ratio of the continuously variable transmission 10 thus far described is controlled by determining the target input speed on the basis of the demanded drive quantity so that the actual input speed may be equal to its target value. However, the magnitude of the speed changing rate affects not only the magnitude of the inertial force of the rotary members including the engine 1 but also the shift shock or the surging. In the ordinary speed change, therefore, the gear ratio of the continuously variable transmission 10 is controlled, for example, by setting a transient target input speed of a first-order lag for the target input speed so that the actual input speed may change following the change of that transient target value. When a demand for abrupt acceleration is made by depressing the accelerator pedal abruptly, on the other hand, a control is executed to change the transient target input speed stepwise, i.e., with a large increase amount so as to improve the acceleration responsibility.

Figure 1:
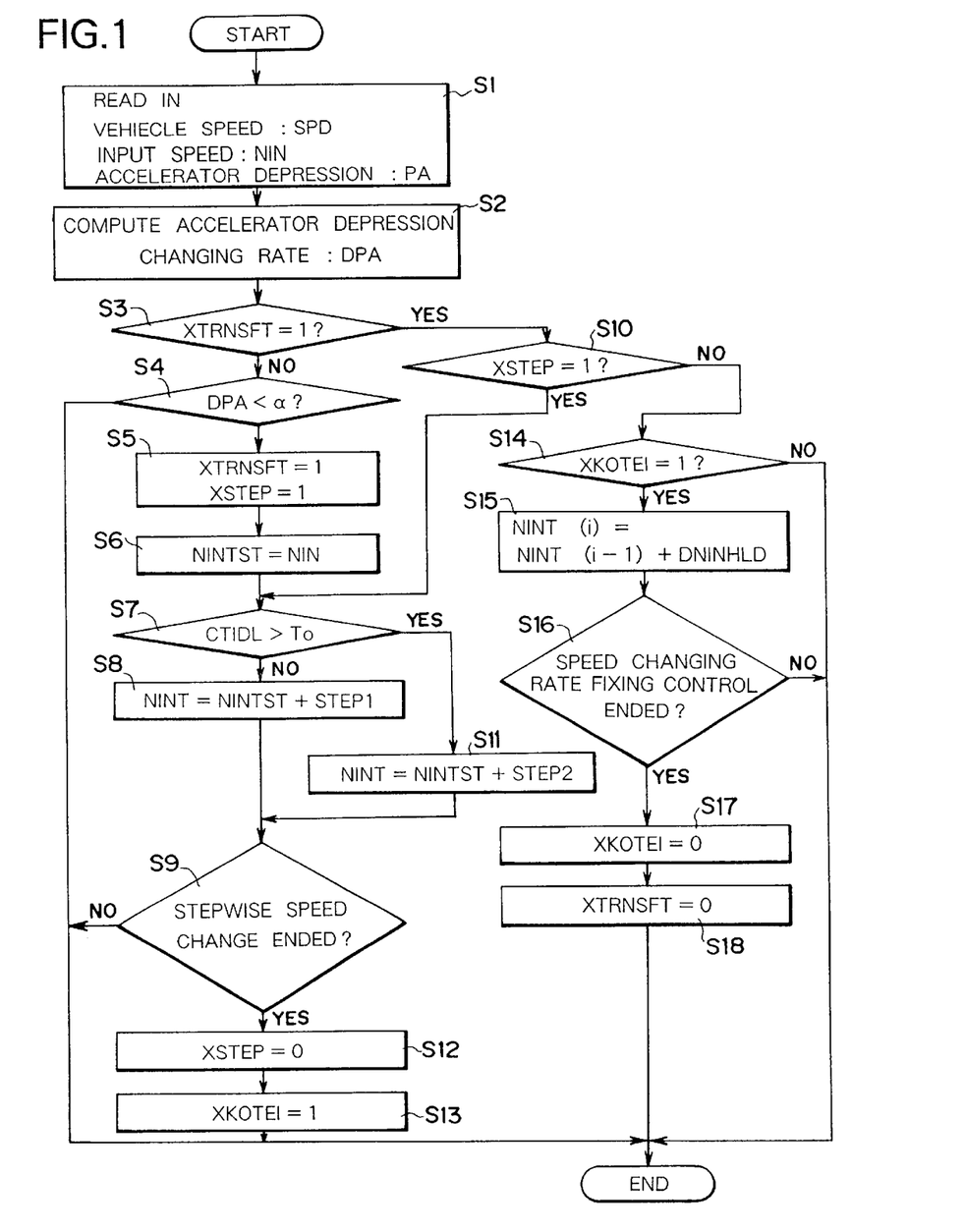
FIG. 1 is a flow chart showing an example of a control to be executed by a control system according to the invention.

The control system according to the invention is constructed to execute the abrupt speed change for changing the transient target input speed stepwise, differently according to the drive/driven states of the vehicle (or the engine 1). FIG. 1 is a flow chart for explaining an example of the controls, in which the routine is repeatedly executed at a predetermined short time interval.

First of all, as shown in FIG. 1, there are read in (at Step S1) the vehicle speed SPD, the actual input speed NIN and the accelerator depression PA as the demanded drive quantity. Next, an accelerator depression changing rate DPA is computed (at Step S2). In other words, there is computed the changing rate of the accelerator depression for a unit time period.

Then, it is decided (at Step S3) whether or not a flag XTRNSFT is set at "1". This flag XTRNSFT is set to "1" when the decision of the abrupt acceleration demand is made, and is initially set at "0". Therefore, the answer of Step S3 is NO at the time when the decision of the abrupt acceleration demand is not made. When the answer of Step S3 is NO, it is decided (at Step S4) whether or not the accelerator depression changing rate DPA computed at Step S2 is higher than a reference changing rate á. This reference changing rate á presents a reference for discriminating the abrupt acceleration demand and a gentler acceleration and has a predetermined value. Here, the reference changing rate á may be a fixed value or a value changing with other conditions such as the vehicle speed.

The routine shown in FIG. 1 is provided for controlling the transient speed change when the abrupt acceleration is demanded. Therefore, this routine is ended without any control, in the absence of the abrupt acceleration demand, that is, when the answer of Step S4 is NO because the changing rate DPA of the accelerator depression PA, if changed, is less than the reference changing rate á. When the answer of Step S4 is YES in the presence of the abrupt acceleration demand, on the contrary, both the flag (i.e., the abrupt acceleration demand flag) XTRNSFT indicating that the abrupt acceleration has been demanded, and a flag (i.e., an abrupt speed change flag) XSTEP indicating the execution of the abrupt speed change control for changing the target input speed stepwise are individually set to "1" (at Step S5).

On the other hand, the initial value NINTST of a target input speed NINT is set (at Step S6) to the actual input speed NIN at that setting instant. Therefore, the speed change control is executed with reference to the actual input speed NIN at the instant when the decision of the abrupt acceleration demand is held. On the other hand, the target input speed NINT at this time is sequentially set at the transient time of the speed change until the target input speed determined according to the running state of the vehicle such as the vehicle speed or the accelerator depression is reached, and is a transient one for dictating the speed changing rate, for example.

Next, it is decided (at Step S7) whether or not a lapse time CTIDL from the instant when the idle contact is switched from ON to OFF has exceeded a reference time period T0. This reference time period T0 is equal to or longer than a time for which the rounding control is made for relaxing the rise of the output shaft torque and for preventing the surging. The reference time period T0 is set to a value for the vehicle to change from the driven state to the drive state, or a larger value than that, and is either set to a predetermined fixed value or varied according to the running state of the vehicle such as the vehicle speed.

If the lapse time period CTIDL has failed to reach the reference time period T0, the answer of Step S7 is NO. Then, the target input speed NINT is computed (at Step S8) by adding a predetermined value STEP1 to the target input speed initial value NINTST. This predetermined value STEP1 is a sum either for inhibiting the initial speed change or for suppressing the speed changing rate. In the former case, the predetermined value STEP1 is set to "0". In the latter case, the predetermined value STEP1 is set to such a small value that the inertial force by the downshift in the continuously variable transmission 10 may not excessively suppress the rise of the output shaft torque of the engine 1.

After the target input speed NINT was thus computed, it is decided (at Step S9) whether or not the abrupt speed change (or the stepwise speed change) according to the abrupt acceleration demand has been ended. This decision is made upon whether or not the actual input speed NIN approaches the target input value NINT so close that their deviation is less than a predetermined value, by increasing the target input speed NINT stepwise and by keeping the value temporarily. When the predetermined value to be added to the target input speed initial value NINTST is "0" or an approximate small value STEP1, therefore, the abrupt speed change control is continued. As a result, the answer of Step S9 is NO, and the control leaves this routine.

If the routine of FIG. 1 is executed again in this state, the abrupt acceleration demand flag XTRNSFT has already been set at "1", and the answer of Step S3 is YES. As a result, the routine advances to Step S10, at which it is decided whether or not the abrupt speed change flag XSTEP is at "1". This abrupt speed change flag XSTEP has also been set at "1" because the decision of the abrupt acceleration demand is held. Therefore, the answer of Step S10 is YES, and the routine advances to Step S7.

If this answer of Step S7 is NO because the lapse time period CTIDL from the instant when the idle contact was switched from ON to OFF has not reached the reference time period T0, the routine advances to Step S8, at which the speed change is inhibited or executed at a low rate. If the time period for finishing the rounding control to prevent the surging has elapsed so that the answer of Step S7 is YES, that is, if it is decided that the vehicle has changed from the driven state to the drive state, the routine advances not to Step S8 but to Step S11, at which the target input speed NINT is computed by adding a predetermined value STEP2 to the target input speed initial value NINTST. This predetermined value STEP2 is one for setting the target input speed to a higher value for raising the speed changing rate when the continuously variable transmission 10 is to be feedback-controlled to equalize the actual input speed to the target value. The value STEP2 is set according to the target input speed which is calculated on the basis of the running state of the vehicle or the demanded drive quantity.

When the control for raising the gear ratio of the continuously variable transmission 10 little by little while the rounding control of the engine output is being made for preventing the surging, that is, when the predetermined value STEP1 at Step S8 is set to a value larger than "0", the target input speed NINT may be computed at Step S11 by adding the predetermined value STEP2 to the target value NINT at the setting time.

When the target input speed NINT is thus increased stepwise, the feedback deviation for controlling the gear ratio of the continuously variable transmission 10 is enlarged to raise the changing rate of the gear ratio, i.e., the speed changing rate.

Thus, for the time period or longer from the switching-OFF of the idle contact to the end of the rounding control for preventing the surging, the speed change is inhibited or executed at a low rate. For this period, therefore, the negative torque accompanying the speed change exerts no action on the engine 1, or the rise of the output shaft torque is not obstructed. By the rounding control, moreover, the output shaft torque is gently raised so that the engine 1 is switched from the driven state to the drive state. Therefore, this change from the driven state to the drive state is gently done so that the surging is prevented or suppressed. If the speed change in the continuously variable transmission 10 is inhibited in that case, the output shaft torque of the engine 1 can be controlled without any especial consideration to the negative torque accompanying the speed change. For this control, moreover, the constant or coefficient for the control can be set to simplify the control and to facilitate the design.

Thus, after the engine 1 was switched to the drive state, the abrupt speed change in the continuously variable transmission 10, i.e., the speed change, in which the target input speed NINT is stepwise increased, is executed to progress the speed change abruptly. As a result, when the actual input speed NIN comes close to the range of a predetermined value of the target input speed NINT stepwise increased, the decision of the end of the stepwise speed change is held to affirm the answer at Step S9. In this case, the abrupt speed change flag XSTEP is reset to zero (at Step S12), and a flag (or a speed changing rate fixing control flag) XKOTEI indicating the execution of the speed changing rate fixing control is set to "1" (at Step S13). This routine is then ended.

In this speed changing rate fixing control, the actual input speed is increased at a constant changing rate when it is equalized to the engine speed (i.e., the target input speed) for establishing at an optimum fuel consumption both the demanded drive quantity and the demand output, as computed on the basis of the running state of the vehicle such as the accelerator depression or the vehicle speed.

When the routine of FIG. 1 is thus restarted, the answer of Step S3 is YES, but the answer of Step S10 is NO. Therefore, the routine advances to Step S14, at which it is decided whether or not the speed changing rate fixing control flag XKOTEI is at "1". When the aforementioned stepwise speed change was ended so that the speed change for fixing the speed changing rate at a constant value is started, the answer of Step S14 is YES because the speed changing rate fixing control flag XKOTEI is set at "1" at Step S13.

And, the target input speed NINT is increased by a constant value (at Step S15). Namely, the following computation is executed:

$$NINT(i)=NINT(i-1)+DNINHLD.$$

Next, it is decided (at Step S16) whether or not the speed changing rate fixing control is ended. If this control is not ended, this routine is ended to continue the foregoing control. If the speed changing rate fixing control is ended so that the answer of Step S16 is YES, on the contrary, the speed changing rate fixing control flag XKOTEI and the abrupt acceleration demand flag XTRNSFT are individually set to zero (at Step S17 and Step S18). Then, this routine is ended. Instantly as the answer of Step S14 is NO, this routine is ended because the speed changing rate fixing control has already been ended.

At the end of this speed changing rate fixing control, the actual input speed NIN is equal within a predetermined deviation range to the target input value which is determined by the vehicular running state such as the vehicle speed or the accelerator depression, so that the end can be decided on the basis of the difference between the target input speed and the actual input speed NIN. If this decision is held, moreover, the speed change on the basis of the abrupt acceleration demand is ended so that the individual flags of Steps S17 and S18 are reset to zero.

Figure 2:
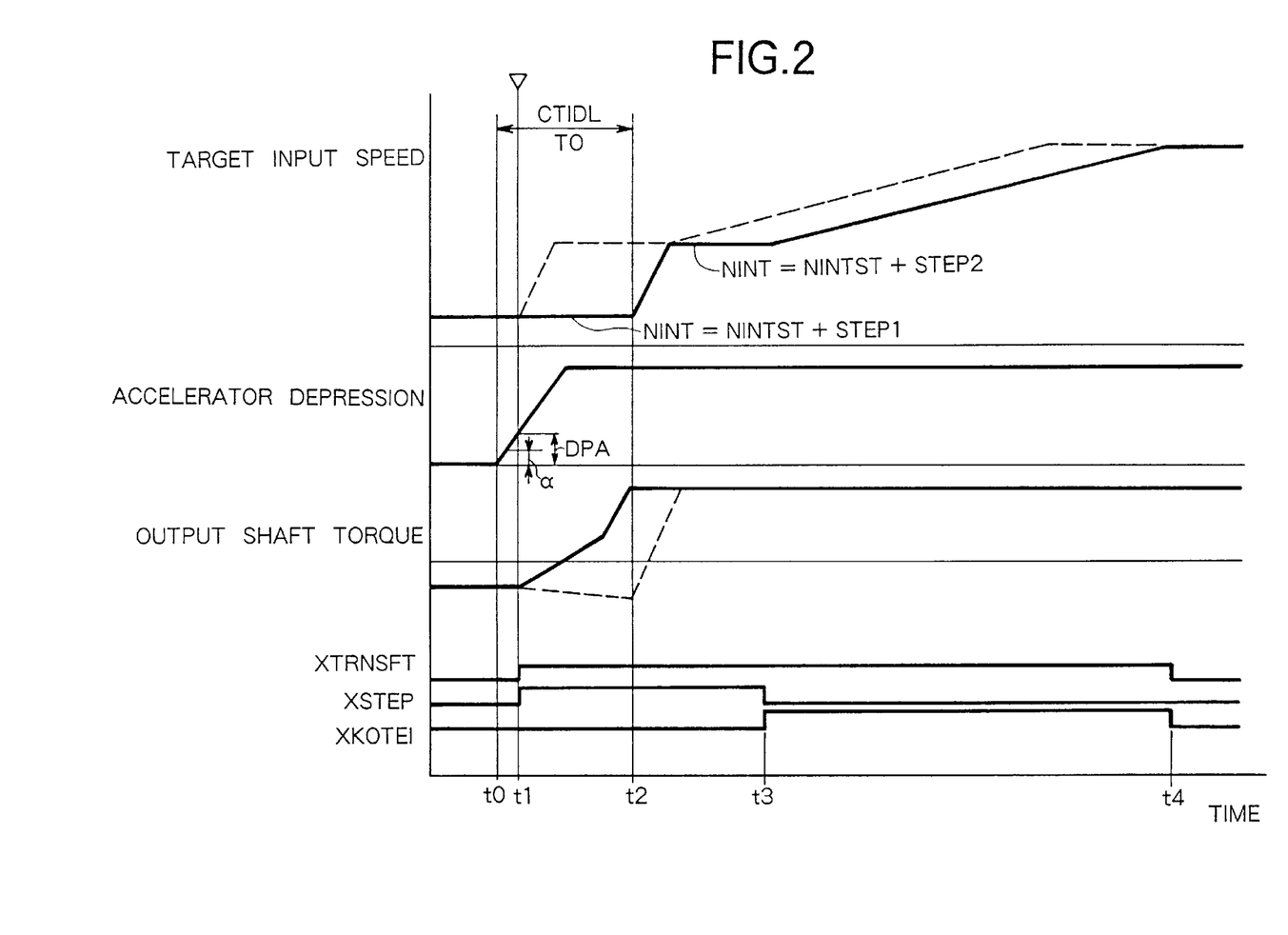
FIG. 2 is a time chart illustrating one example of a change in the output shaft torque of the case in which the control of FIG. 1 is executed.

The variation of the output shaft torque of the case in which the aforementioned control is executed is illustrated in FIG. 2. When the accelerator pedal is deeply depressed at time t0 midway of the case in which the vehicle is running in the driven state with the zero accelerator depression, the lapse time CTIDL from time t0 is counted. If the decision of the abrupt acceleration demand is held at time t1 because the accelerator depression changing rate DPA exceeds the reference changing rate á, moreover, the degree of opening of an throttle valve (e.g., an electronic throttle valve) is gradually increased, and the abrupt acceleration demand flag XTRNSFT and the abrupt speed change flag XSTEP are individually set to "1".

The throttle opening is so controlled that it may not be instantly set to the opening based on the acceleration demand but the output shaft torque may be varied at a relatively gentle gradient by the so-called "rounding control". This variation is illustrated by a solid line in FIG. 2.

In the case of an abrupt acceleration demand from the driven state, that is, in case the lapse time CTIDL from the time t0 of switching the idle contact from ON to OFF has not reached the reference time period T0, on the other hand, the control of the gear ratio of the continuously variable transmission 10 is executed by employing the summed speed of the predetermined STEP1 and the actual input speed NIN at the time t1 when the decision of the abrupt acceleration demand is held, as the target input speed NINT. The predetermined value STEP1 is zero or as small as zero so that the speed change in the continuously variable transmission 10 is inhibited or executed at a low rate. The variation of the target input speed NINT is illustrated by a solid line in FIG. 2.

As a result, the inertial force, as caused by the speed change in the continuously variable transmission 10, does not act as a negative torque on the output shaft of the engine 1 so that the output shaft torque rises with a relatively low gradient according to the rounding control. When the rounding control is ended after the change from the driven state to the drive state, moreover, the throttle opening is increased in response to the abrupt acceleration demand so that the output shaft torque rises accordingly abruptly.

By thus substantially inhibiting the speed change in the continuously variable transmission 10 or keeping an approximate state, the output shaft torque varies from a negative torque to a positive torque during the rounding control thereby to reduce the torque changing rate at the changing time from the driven state to the drive state. As a result, the surging or the resulting shock is prevented or relaxed even if the power transmission line for transmitting the power to the wheels 5 loses its play or looseness or if the elastic line reverses its twist.

When the aforementioned lapse time CTIDL reaches the reference time period T0, moreover, the stepwise speed change of the gear ratio of the continuously variable transmission 10 is started at time t2. Specifically, the target input speed NINT is set to the sum of the actual input speed NINTST at the time when the decision of the abrupt acceleration demand is held and the predetermined value STEP2, so that it is stepwise increased. As a result, the feedback deviation for controlling the gear ratio increases so that the speed change is executed at a high rate. Accordingly, the driving force of the vehicle rises to improve the acceleration responsibility.

As an abrupt speed change at a high changing rate is thus executed so that the actual input speed NIN approaches the stepwise varied target value NINT, the end of the stepwise speed change is decided. At time t3, the abrupt speed change flag XSTEP is reset to zero, and the speed changing rate fixing control flag XKOTEI is set to "1". After this, there is executed the speed changing rate fixing control for increasing the target input speed NINT by predetermined values. The speed changing rate at this time is lower than that at the time of the aforementioned stepwise speed change.

If the actual input speed NIN is substantially equalized, as a result of executing the speed changing rate fixing control, to the target input value which is determined on the basis of the running state of the vehicle, the end of the speed changing rate fixing control is decided. At time t4, both the abrupt acceleration demand flag XTRNSFT and the speed changing rate fixing control flag XKOTEI are reset to zero.

When the abrupt speed change in the continuously variable transmission is executed simultaneously with the holding of the decision of the abrupt acceleration demand, on the contrary, the output shaft torque varies, as indicated by a broken line in FIG. 2. When the abrupt speed change in the continuously variable transmission is executed simultaneously with the rounding control of the output shaft torque, more specifically, a negative torque accompanying the speed change acts on the output shaft of the engine so that the state does not change from the driven to drive states in the rounding control. At the end of the abrupt speed change in the continuously variable transmission, moreover, the negative torque having acted on the output shaft of the engine is lightened or released so that the output shaft torque of the engine abruptly rises in response to the abrupt acceleration demand. As a result, the varying gradient of the torque at the changing time from the driven state to the drive state rises to cause the surging and the resulting shock.

If an abrupt acceleration demand is made in the aforementioned control when the vehicle is in the drive state, that is, if the lapse time CTIDL reaches the reference time period T0 when the decision of the abrupt acceleration demand is held, the answer of Step S7 is affirmative, and the routine advances to Step S11, at which the stepwise speed change is instantly started. At this time, therefore, the acceleration responsibility is improved.

Here in the specific embodiment thus far described, it is decided, on the basis of the reach to the reference time period T0 by the lapse time CTIDL from the switched time of the idle contact from ON to OFF, that the vehicle has changed from the driven state to the drive state. In order to improve the acceleration responsibility, however, it is desired to decide the change to the drive state as early as possible. In order to satisfy such desire, the driving force may be estimated to decide on the basis of the estimated driving force that the vehicle has changed from the driven state to the drive state.

Figure 3:
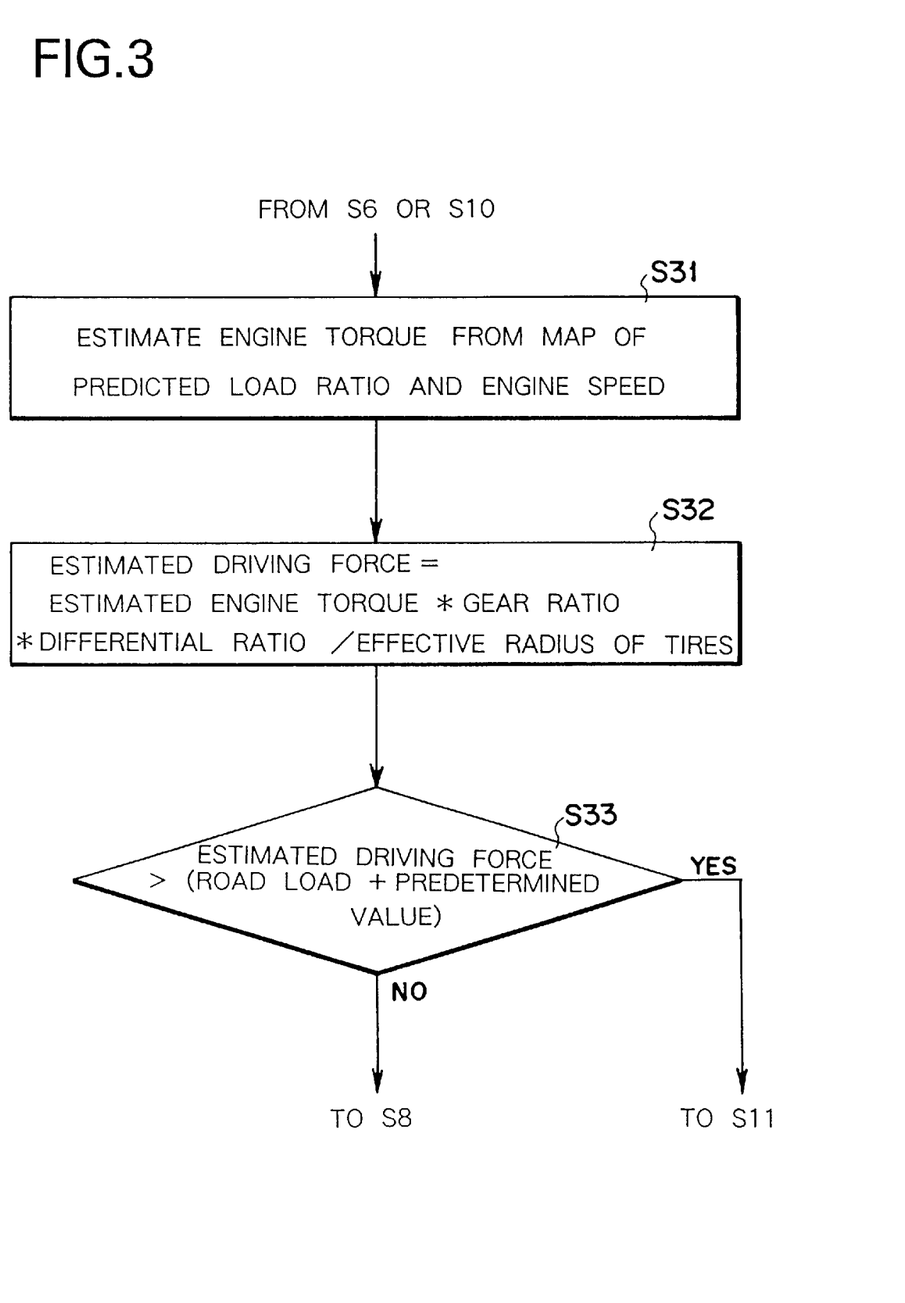
FIG. 3 is a flow chart for explaining a control example for deciding a change from a driven state to a drive state for executing an abrupt speed change.

One example is shown in FIG. 3. FIG. 3 is a flow chart showing a series of operations to be done in place of that of Step S7 of FIG. 1. In other words, the operations of this flow chart is executed after the operation of Step S6 or Step S10 of FIG. 1. First of all, from the throttle opening or the like set by the aforementioned rounding control, the predicted load ratio (i.e., the ratio of the load to the whole load) of the engine 1 is computed, and the engine torque is estimated (at Step S31) from the map of the predicted load ratio computed and the engine speed. Next, an estimated driving force is computed (at Step S32) on the basis of the estimated engine torque, the gear ratio, the reduction ratio (or the differential ratio) of the differential 4, and the effective radius of tires. Next, it is decided (at Step S33) whether or not the estimated driving force is higher than the sum of the road load and a predetermined value.

If the rounding control is made for preventing the shock in the course of the control to raise the output shaft torque on the basis of the abrupt acceleration demand, it takes a considerable time period to change into the drive state in the case of an acceleration from the driven state, thereby to establish a state in which the estimated driving force is at or lower the road load. If the estimated driving force exceeds the road load, moreover, the vehicle is switched to the drive state.

If the answer of Step S33 is negative, therefore, the estimated driving force is still low so that the vehicle is in the driven state. Therefore, the routine advances to Step S8 of FIG. 1, at which the speed change is inhibited or executed (slowly) at a low rate. If the answer of Step S33 is affirmative, on the contrary, the vehicle has been switched to the drive state. Therefore, the routine advances to Step S11 of FIG. 1 thereby to execute the abrupt speed change for increasing the target input speed NINT stepwise.

By this control, too, the abrupt speed change is executed instantly as the vehicle is changed from the driven state to the drive state, so that the acceleration responsibility is improved.

Here will be briefly described the relations between the specific embodiment thus far described and the invention.

The means for executing the operation of Step S7 shown in FIG. 1 and the operation of Step S33 of FIG. 3 corresponds to drive state deciding means of the invention, and the means for executing the operations of Steps S8 and S11 of FIG. 1 corresponds to speed change control means.

Here, in the specific embodiment described above, the abrupt speed change is executed by increasing the target input speed stepwise. In short, however, the abrupt speed change in this embodiment may be raised in its changing rate as high as possible, and the means therefor should not be limited to the means for raising the target input speed stepwise.

On the other hand, the decision on the change from the driven state to the drive state should not be limited to the means exemplified in the foregoing specific embodiment but can be made by suitable means, if necessary. For the operation to compute the target driving force from the accelerator depression or the like so that the engine torque may be controlled to achieve the target driving force computed, the means can be embodied as one for deciding that the vehicle has been changed from the driven state to the drive state, by measuring the lapse time period after the target drive force exceeds the sum of the road load and a predetermined value and on the basis of the arrival of the measured lapse time period at the reference time period.

Here will be synthetically described the advantages to be obtained from the invention. According to the invention, if the vehicle is in the driven state when the abrupt acceleration demand is made, it is decided that the vehicle has been changed from the driven state to the drive state. After this decision is held, the abrupt speed change control is executed in the continuously variable transmission. Even if the rounding control of the output torque of the prime mover is executed in response to the abrupt acceleration demand, therefore, the abrupt speed change control of the continuously variable transmission is not executed at the time. It is, therefore, possible to avoid the interference between the controls of the two or the time lag, as caused by the interference, in the change to the drive state. On the other hand, the abrupt speed change control of the continuously variable transmission is executed after the vehicle was changed to the drive state, so that the changing rate (or the changing gradient) of the torque at the changing instant from the driven state to the drive state can be relaxed to prevent or suppress the surging and the resulting shock.

According to the invention, on the other hand, the speed change control of the continuously variable transmission is not executed, until the change from the driven state to the drive state after the decision of the abrupt acceleration demand is held. For this time period, therefore, it is possible to execute the control of the prime mover such as the rounding control of the output torque solely on the basis of the abrupt acceleration demand. Therefore, the prime mover can be controlled easily and precisely to set more proper timing of the start of the abrupt speed change control in the continuously variable transmission.

According to the invention, moreover, the abrupt speed change control of the continuously variable transmission can be executed instantly in response to the abrupt acceleration demand, if from the drive state, so that the acceleration responsibility can be improved without deteriorating the shock.

According to the invention, moreover, the target input speed can be drastically increased for the abrupt speed change so that the speed changing rate can be raised to perform a speed change in response to the demand.

What is claimed is:

1. A speed change control system for a continuously variable transmission, for controlling a gear ratio to effect an abrupt speed change when it is decided that a driver demands an abrupt acceleration; comprising:

drive state deciding means for deciding that the vehicle has changed from a driven state to a drive state, in response to the demand of said abrupt acceleration, when the vehicle is in the driven state; and speed change control means for controlling said continuously variable transmission to effect said abrupt speed change, after said drive state deciding means decides that the vehicle has changed from the driven state to the drive state.

2. A speed change control system according to claim 1, wherein said speed change control means includes means for controlling the continuously variable transmission to interrupt a speed change for a time period from the decision of said abrupt acceleration demand to the change of the vehicle to the drive state, when said abrupt acceleration is demanded at the driven state of the vehicle.

3. A speed change control system according to claim 1, wherein said speed change control means includes means for controlling the continuously variable transmission to perform the abrupt speed change when said abrupt acceleration demand is decided, when said abrupt acceleration is demanded at the drive state of the vehicle.

4. A speed change control system according to claim 1, wherein said speed change control means includes means for controlling the gear ratio of the continuously variable transmission so that an input speed may be a target input speed set on the basis of a running state of the vehicle, and for making an increase amount of the target input speed larger than an increase amount at a speed change other than the abrupt speed change when the abrupt speed change is to be performed.

5. A speed change control system according to claim 3, wherein said speed change control means includes means for controlling the gear ratio of the continuously variable transmission so that an input speed may be a target input speed set on the basis of a running state of the vehicle, and for making an increase amount of the target input speed larger than an increase amount at a speed change other than the abrupt speed change when the abrupt speed change is to be performed.

6. A speed change control system according to claim 1, further comprising:

output control means for executing a rounding control to relax an increase of an output of a prime mover mounted on the vehicle, when the abrupt acceleration is demanded.

7. A speed change control system according to claim 1, wherein said speed change control means includes means for controlling the continuously variable transmission to lower a speed changing rate to a value as low as zero for a time period from the decision of said abrupt acceleration demand to the change of the vehicle to the drive state, when said abrupt acceleration is demanded at the driven state of the vehicle.

8. A speed change control system according to claim 1, further comprising:

means for deciding that the abrupt acceleration is demanded, on the basis of a changing rate of an accelerator depression.

9. A speed change control system according to claim 1, wherein said drive state deciding means includes means for deciding that the vehicle has changed from the driven state to the drive state, on the basis of a lapse time period from an instant when a prime mover mounted on the vehicle changes from an idling state to a non-idling state.

10. A speed change control system according to claim 1, wherein said drive state deciding means includes: means for estimating a driving force of the vehicle; and means for deciding that the vehicle has changed to the drive state, when the estimated driving force is higher than a road load.

11. A speed change control system for a continuously variable transmission, for controlling a gear ratio to effect an abrupt speed change when it is decided that a driver demands an abrupt acceleration, comprising:

a controller for deciding that the vehicle has changed from a driven state to a drive state in response to the demand of said abrupt acceleration when the vehicle is in the driven state; and for controlling said continuously variable transmission to effect said abrupt speed change after said drive state deciding means decides that the vehicle has changed from the driven state to the drive state.

12. A speed change control system according to claim 11, wherein said controller includes a judging device for judging that the vehicle has changed from a driven state to a drive state in response to the demand of said abrupt acceleration when the vehicle is in the driven state; and a shift controller for controlling said continuously variable transmission to effect said abrupt speed change after said judging device judges that the vehicle has changed from the driven state to the drive state.

13. A speed change control system according to claim 12, wherein said shift controller includes a device for controlling the continuously variable transmission to interrupt a speed change for a time period from the judge of said abrupt acceleration demand to the change of the vehicle to the drive state, when said abrupt acceleration is demanded at the driven state of the vehicle.

14. A speed change control system according to claim 12, wherein said shift controller includes a device for controlling the continuously variable transmission to perform the abrupt speed change when said abrupt acceleration demand is judged, when said abrupt acceleration is demanded at the drive state of the vehicle.

15. A speed change control system according to claim 12, wherein said shift controller includes a device for controlling the gear ratio of the continuously variable transmission so that an input speed may be a target input speed set on the basis of a running state of the vehicle, and for making an increase amount of the target input speed larger than an increase amount at a speed change other than the abrupt speed change when the abrupt speed change is to be performed.

16. A speed change control system according to claim 14, wherein said shift controller includes a device for controlling the gear ratio of the continuously variable transmission so that an input speed may be a target input speed set on the basis of a running state of the vehicle, and for making an increase amount of the target input speed larger than an increase amount at a speed change other than the abrupt speed change when the abrupt speed change is to be performed.

17. A speed change control system according to claim 12, further comprising:
    output controller for executing a rounding control to relax an increase of an output of a prime mover mounted on the vehicle, when the abrupt acceleration is demanded.

18. A speed change control system according to claim 12,
    wherein said shift controller includes a device for controlling the continuously variable transmission to lower a speed changing rate to a value as low as zero for a time period from the decision of said abrupt acceleration demand to the change of the vehicle to the drive state, when said abrupt acceleration is demanded at the driven state of the vehicle.

19. A speed change control system according to claim 12, further comprising:
    a device for deciding that the abrupt acceleration is demanded, on the basis of a changing rate of an accelerator depression.

20. A speed change control system according to claim 12,
    wherein said judging device includes a device for judging that the vehicle has changed from the driven state to the drive state, on the basis of a lapse time period from an instant when a prime mover mounted on the vehicle changes from an idling state to a non-idling state.

21. A speed change control system according to claim 12,
    wherein said judging device includes a device for estimating a driving force of the vehicle; and deciding device for deciding that the vehicle has changed to the drive state, when the estimated driving force is higher than a road load.

22. A speed change control method for a continuously variable transmission, for controlling a gear ratio to effect an abrupt speed change when it is decided that a driver demands an abrupt acceleration, comprising:
    a step for judging that the vehicle has changed from a driven state to a drive state, in response to the demand of said abrupt acceleration when the vehicle is in the driven state; and
    a step for controlling said continuously variable transmission to effect said abrupt speed change, after it is judged that the vehicle has changed from the driven state to the drive state.

23. A speed change control method according to claim 22,
    wherein said step for controlling said continuously variable transmission includes a step for controlling the continuously variable transmission to interrupt a speed change for a time period from the judge of said abrupt acceleration demand to the change of the vehicle to the drive state, when said abrupt acceleration is demanded at the driven state of the vehicle.

24. A speed change control method according to claim 22,
    wherein said step for controlling said continuously variable transmission includes a step for controlling the continuously variable transmission to perform the abrupt speed change when said abrupt acceleration demand is decided, when said abrupt acceleration is demanded at the drive state of the vehicle.

25. A speed change control method according to claim 22,
    wherein said step for controlling said continuously variable transmission includes a step for controlling the gear ratio of the continuously variable transmission so that an input speed may be a target input speed set on the basis of a running state of the vehicle, and for making an increase amount of the target input speed larger than an increase amount at a speed change other than the abrupt speed change when the abrupt speed change is to be performed.

26. A speed change control system according to claim 24,
    wherein said step for controlling said continuously variable transmission includes a step for controlling the gear ratio of the continuously variable transmission so that an input speed may be a target input speed set on the basis of a running state of the vehicle, and for making an increase amount of the target input speed larger than an increase amount at a speed change other than the abrupt speed change when the abrupt speed change is to be performed.

27. A speed change control method according to claim 22, further comprising:
    a step for executing a rounding control to relax an increase of an output of a prime mover mounted on the vehicle, when the abrupt acceleration is demanded.

28. A speed change control method according to claim 22,
    wherein said step for controlling said continuously variable transmission includes a step for controlling the continuously variable transmission to lower a speed changing rate to a value as low as zero for a time period from the decision of said abrupt acceleration demand to the change of the vehicle to the drive state, when said abrupt acceleration is demanded at the driven state of the vehicle.

29. A speed change control method according to claim 22, further comprising:
    a step for judging that the abrupt acceleration is demanded, on the basis of a changing rate of an accelerator depression.

30. A speed change control method according to claim 22,
    wherein said step for judging includes a step for judging that the vehicle has changed from the driven state to the drive state, on the basis of a lapse time period from an instant when a prime mover mounted on the vehicle changes from an idling state to a non-idling state.

31. A speed change control method according to claim 22,
    wherein said step for judging includes: a step for estimating a driving force of the vehicle; and a step for deciding that the vehicle has changed to the drive state, when the estimated driving force is higher than a road load.

* * * * *

UNITED STATES PATENT AND TRADEMARK OFFICE
CERTIFICATE OF CORRECTION

PATENT NO. : 6,450,917 B2　　　　　　　　　　　　　　　　　　　　　　　　　Page 1 of 1
DATED : September 17, 2002
INVENTOR(S) : Taniguchi et al.

It is certified that error appears in the above-identified patent and that said Letters Patent is hereby corrected as shown below:

<u>Title page,</u>
Item [75], should read:
-- [75]　Inventors:　　　Hiroji Taniguchi, Okazaki; Katsumi Kono, Toyota; Kenji Matsuo, Toyota; Hideki Yasue, Toyota; Tadashi Tamura, Toyota; Daisuke Inoue, Toyota; Yoshiaki Yamamoto, Toyota; Hiroki Kondo, Toyota; Isao Takagi, Okazaki; Zenichiro Mashiki, Nisshin; Hirofumi Kubota, Mishima; Hiroya Tanaka, Aichi-ken; Shinichi Mitani, Toyota, all of (JP) --

Signed and Sealed this

Fifteenth Day of July, 2003

JAMES E. ROGAN
*Director of the United States Patent and Trademark Office*